(12) United States Patent
Chuang

(10) Patent No.: US 7,445,478 B2
(45) Date of Patent: Nov. 4, 2008

(54) PORTABLE DISPLAY DEVICE

(75) Inventor: Chih-Peng Chuang, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/708,279

(22) Filed: Feb. 19, 2007

(65) Prior Publication Data

US 2008/0198155 A1 Aug. 21, 2008

(51) Int. Cl.
*H01R 3/00* (2006.01)
(52) U.S. Cl. ........................... 439/165; 439/928
(58) Field of Classification Search ............... 439/31, 439/131, 165, 170, 173, 353, 357, 640, 928
See application file for complete search history.

(56) References Cited

U.S. PATENT DOCUMENTS 4,054,352 A * 10/1977 Rudin ..................... 439/304
5,387,136 A * 2/1995 Britton ..................... 439/668
5,839,919 A * 11/1998 Chen ........................ 439/529
6,140,934 A * 10/2000 Lam ......................... 340/815.4
6,157,163 A * 12/2000 Blackwood ................ 320/115
7,062,300 B1 * 6/2006 Kim ......................... 455/569.1
7,292,881 B2 * 11/2007 Seil et al. .................. 455/575.1

* cited by examiner

*Primary Examiner*—Thanh-Tam T Le
(74) *Attorney, Agent, or Firm*—Peter F. Corless; Steven M Jensen; Edwards Angell Palmer & Dodge LLP

(57) ABSTRACT

A portable display device is applicable to an electronic device having a socket provided with a second electrical connector. The portable display device includes a body having a display and a plurality of operating keys; an extension portion having a first end pivotably connected to the body, and a second end pluggable into the socket; a first electrical connector installed on the second end of the extension portion and engageable with the second electrical connector; and a lock member installed on the extension portion for locking the extension portion in the socket.

7 Claims, 4 Drawing Sheets

PORTABLE DISPLAY DEVICE

BACKGROUND OF THE INVENTION

1. Field of the Invention

The present invention relates generally to portable display devices, and more particularly, to a liquid crystal module applicable to an electronic device.

2. Description of Related Art

As general electronic devices such as servers or vehicle computers are controlled by software, and operations such as maintenance, data access, modification and deletion need to be performed on the electronic devices, the electronic devices must be equipped with display devices such as LCDs or LCD modules for completing the above operations.

These display devices are generally fixed on plates of electronic devices or handles of servers, or inserted in holders disposed on the plates of the electronic devices. Thus, each electronic device must be equipped with a display device, although usage of the display device is not high, which accordingly increases the cost of electronic devices.

In addition, different from general desktop liquid crystal displays that can be adjusted in angle for meeting demands of users, these above-described display devices are fixed and cannot be adjusted in position. Thus, if position of an electronic device such as a server on a frame is too high or too low, it will bring inconvenience for operators to correctly read information from the display device of the server.

Therefore, there is a need to provide a display device applicable to an electronic device, which can be hot-plugged and adjusted in direction and angle so as to facilitate operation of users.

SUMMARY OF THE INVENTION

According to the above drawbacks, an objective of the present invention is to provide a portable display device that can be disposed in electronic devices so as to overcome the drawback of prior techniques that requires installation of a liquid crystal display in every electronic device.

Another objective of the present invention is to provide a portable display device that can be adjusted in angle and direction so as to facilitate operation of users. In order to attain the above and other objectives, the present invention provides a portable display device applicable to an electronic device. The electronic device has a socket provided with a second electrical connector. The portable display device includes a body having a display and a plurality of operating keys; an extension portion having a first end pivotably connected to the body, and a second end pluggable into the socket; a first electrical connector installed on the second end of the extension portion and engageable with the second electrical connector; and a lock member installed on the extension portion for locking the extension portion in the socket.

The electronic device has a lock hole disposed in the socket of the electronic device, and the portable display device further includes a lock hook disposed on the lock member engageable with the lock hole. By engaging the lock hook of the lock member with the lock hole of the socket, the extension portion of the body can be locked in the socket of the electronic device.

The lock member has a pressing portion moving in accordance with a movement of the lock hook. By pressing the lock member through the pressing portion, the lock hook is released from the lock hole, thus the extension portion can be taken out from the socket of the electronic device so that the first electrical connector can be disconnected from the second electrical connector.

The portable display device further includes an electrical switch disposed on the pressing portion. While pressing the pressing portion, the electrical switch is operated for interrupting a software program stored in the body, and further disconnecting the first electrical connector from the second electrical connector so as to avoid adversely affecting a main program running in the electronic device.

The portable display device further includes a pivoting mechanism pivotably connected to the body and fixed to the first end of the extension portion.

According to some embodiments, the pivoting mechanism has a first pivoting member longitudinally pivotably connected to the body, and a second pivoting member laterally pivotably connected to the first pivoting member and fixed to the first end of the extension portion.

According to another embodiment, the pivoting mechanism has a first pivoting member pivotably connected to the body and having a socket joint, and a third pivoting member fixed to the first end of the extension portion and having a ball joint jointed to the socket joint.

Therefore, according to the present invention, by disposing a hot-pluggable extension portion of the body in the socket of the electronic device and making a first electrical connector disposed on the extension portion electrically connected with the second electrical connector in the socket of the electronic device, the body and the electronic device can be electrically connected together. The extension portion is further locked in the socket of the electronic device through a lock member disposed at one side of the extension portion. On the other hand, when the extension portion is taken out from the socket, the electrical switch on the pressing portion is operated so as to interrupt the software in the body, thus, the hot-plugging can be operated. In addition, a pivoting mechanism of a one-dimensional, two-dimensional or three-dimensional structure is disposed at one side of the body for adjusting angle and direction of the body, thereby facilitating operation of users.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

First Embodiment

Figure 1:
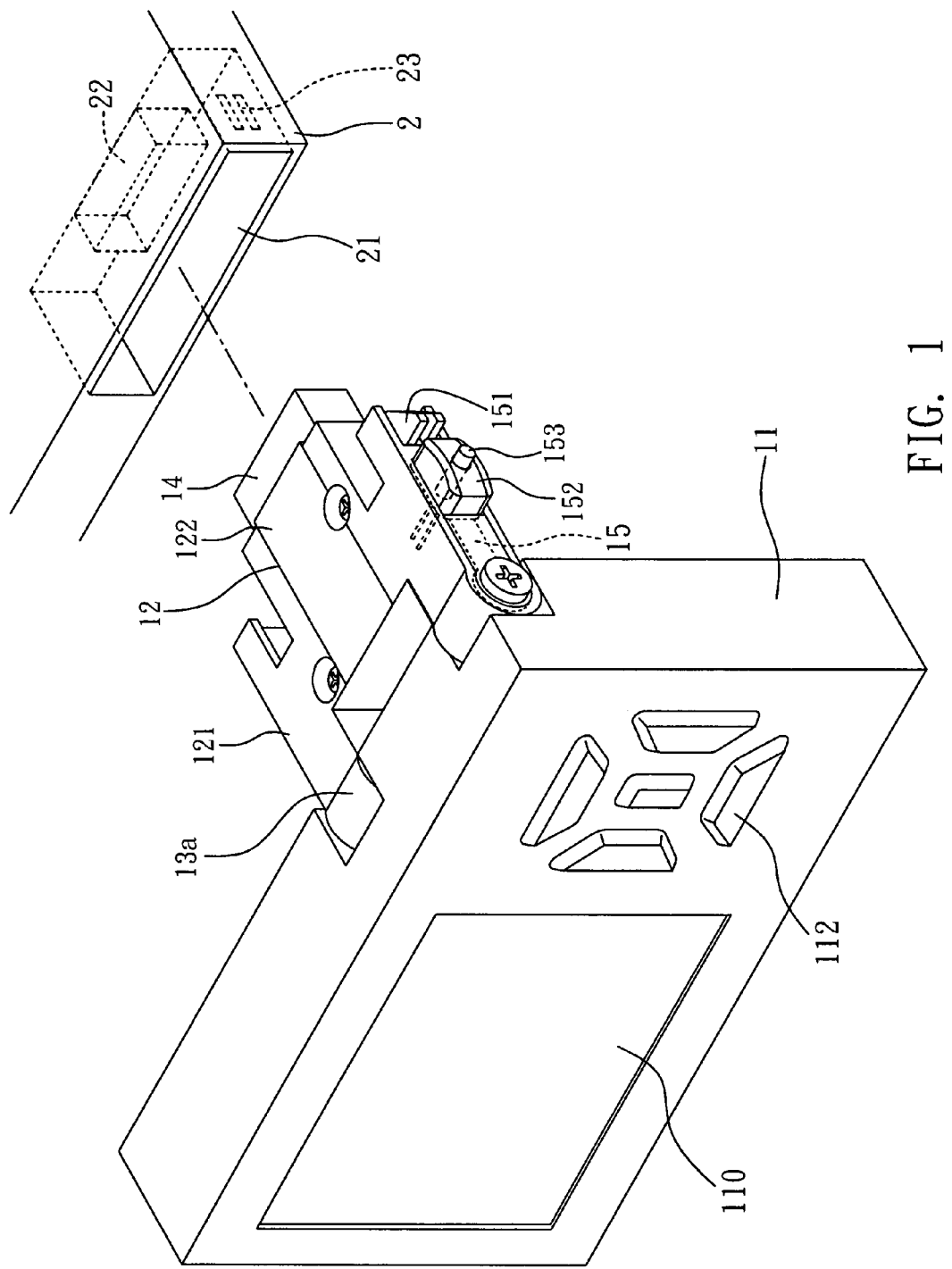
FIG. 1 is a schematic diagram of a portable display device of a first embodiment according to the present invention.

FIG. 1 shows a portable display device of a first embodiment according to the present invention. As shown in FIG. 1, the portable display device comprises a body 11 having a liquid crystal display 110 and a plurality of operating keys 112. An extension portion 12 is disposed at one side of the body 11 (for example, at back side of the body 11). A pivoting mechanism (for example, a one-dimensional pivoting mechanism 13a, as shown in FIG. 1) is disposed between the body 11 and the extension portion 12, allowing the body 11 to swing up and down. The extension portion 12 has a second end 122 pluggable into a socket 21 of an electronic device 2. A first electrical connector 14 such as a USB connector is disposed on a first end 121 of the extension portion 12, and a second electrical connector 22 engageable with the first electrical connector 14 is disposed in the socket 21 such that when the extension portion 12 is plugged into the socket 21 of the electronic device 2, the first electrical connector 14 can be electrically connected with the second electrical connector 22. A lock member 15 is disposed at one side of the extension portion 12. A lock hook 151 is disposed on the lock member 15 and a lock hole 23 is disposed in the socket 21 of the electronic device 2. By engaging the lock hook 151 with the lock hole 23, the extension portion 12 can be locked in the socket 21 of the electronic device 2. A pressing portion 152 is further disposed on the lock member 15, the pressing portion 152 moving in accordance with a movement of the lock hook 151. By pressing the lock member 15 through the pressing portion 152, the lock hook 151 can be released from the lock hole 23, thus the extension portion 12 can be taken out from the socket 21 of the electronic device 2, and the first electrical connector 14 can be disconnected from the second electrical connector 22.

An electrical switch 153 is disposed on the pressing portion 152. While the pressing portion 152 is pressed, the electrical switch 153 is synchronously operated so as to interrupt a software program stored in the body 11 and further disconnect the first electrical connector 14 from the second electrical connector 22, thereby avoiding adversely affecting a main program running in the electronic device 2.

The electronic device 2 can be a data processing device such as a server or a computer. As the body 11 is connected with the extension portion 12 through the one-dimensional pivoting mechanism 13a, the body 11 can swing up and down. As a result, operators or maintenance persons can adjust angle of the body 11 so as to make the display 110 and the operating keys 112 located at a position facing the operators or maintenance personnel, thereby facilitating inspection of the electronic device 2.

As the body 11 can be connected to the electronic device 2 through the extension portion 12 disposed in the socket of the electronic device 2, and hot-plugging can be performed when the electronic device 2 is in operation, the electronic device 2 does not need to comprise any expensive liquid crystal display. Instead, only a socket 21 needs to be disposed in the electronic device 2 such that the extension portion 12 can be inserted therein, thereby reducing the fabrication cost of the electronic device 2.

Second Embodiment

Figure 2A:
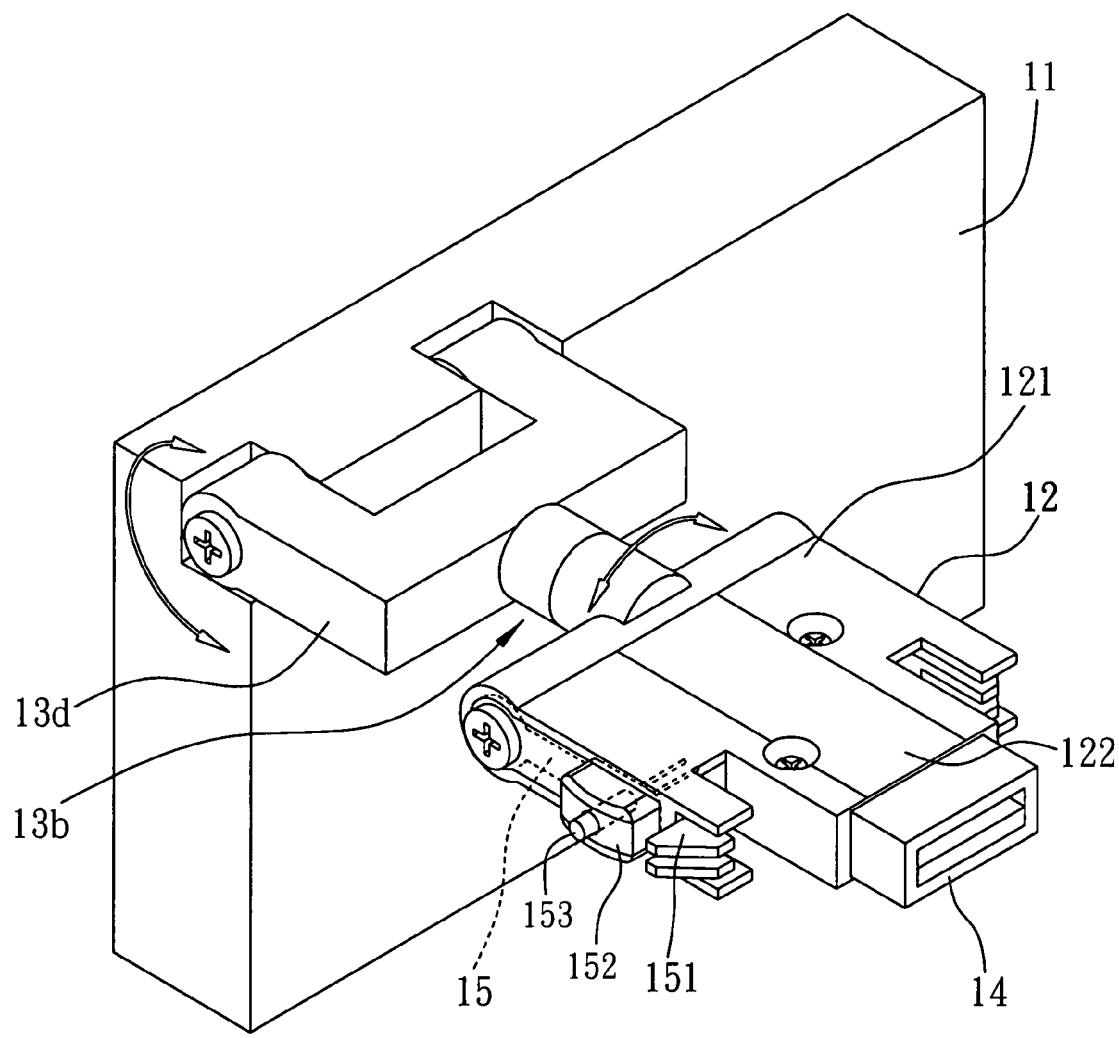
FIG. 2A is a schematic diagram of a portable display device of a second embodiment according to the present invention.
Figure 2B:
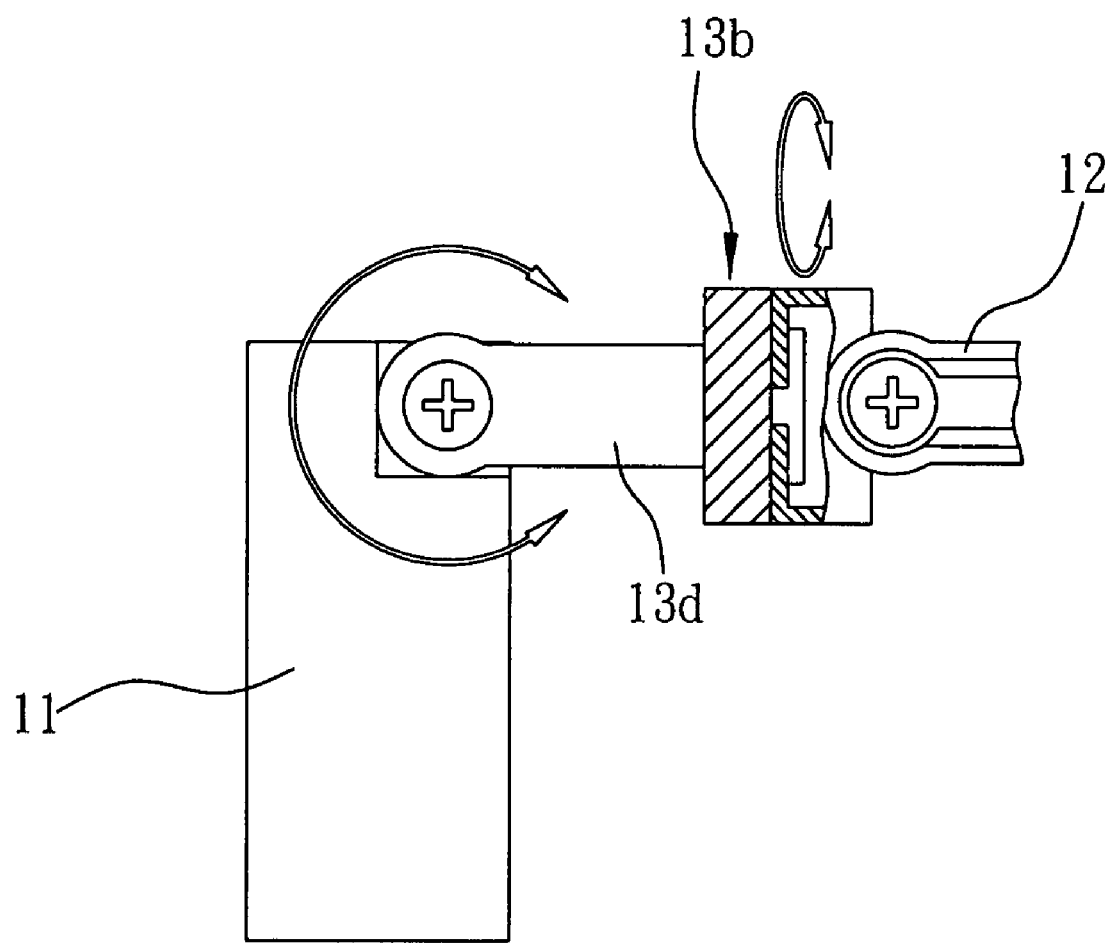
FIG. 2B is a side view of the portable display device shown in FIG. 2A.

FIGS. 2A and 2B show a portable display device of a second embodiment according to the present invention. Different from the first embodiment, the pivoting mechanism of the portable display device of the second embodiment is two-dimensional and has a first pivoting member 13d longitudinally pivotably connected to the body 11 and a second pivoting member 13b laterally pivotably connected to the first pivoting member 13d and fixed to the first end 121 of the extension portion 12. Through the first and second pivoting members 13b and 13d, the body 11 can rotate in addition to swinging up and down. Thus, the adjusting freedom of the body 11 is increased. The liquid crystal display 110 and the operating keys 112 of the body 11 can be adjusted in direction and angle according to the need of operators or maintenance persons so as to facilitate their operation.

Third Embodiment

Figure 3:
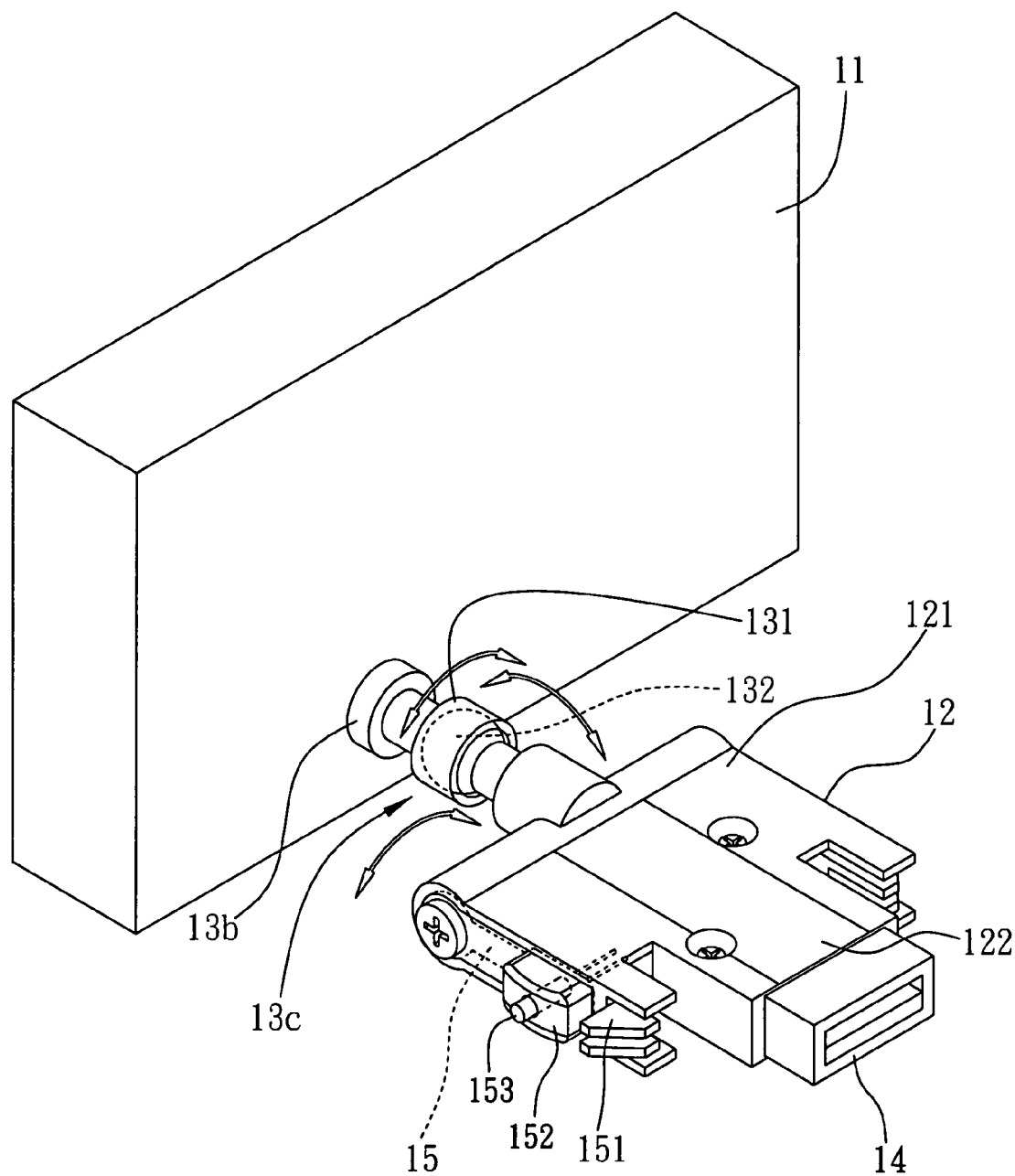
FIG. 3 is a schematic diagram of a portable display device of a third embodiment according to the present invention.

FIG. 3 shows a portable display device of a third embodiment according to the present invention. In the third embodiment, the pivoting mechanism of the portable display device is three-dimensional and has the second pivoting member 13b pivotably connected to the body 11 and having a socket joint 131, and a third pivoting member 13c fixed to the first end 121 of the extension portion 12 and having a ball joint 132 jointed to the joint socket 131, allowing the body 11 to swing and rotate in any angle so as to increase the adjusting freedom of the body 11.

Therefore, according to the present invention, by disposing a hot-pluggable extension portion of the body in the socket of the electronic device and making a first electrical connector disposed on the extension portion electrically connected with the second electrical connector in the socket of the electronic device, the body and the electronic device can be electrically connected together. The extension portion is further locked in the socket of the electronic device through a lock member disposed at one side of the extension portion. On the other hand, when the extension portion is taken out from the socket, the electrical switch on the pressing portion is operated so as to interrupt the software in the body, thus, the hot-plugging can be operated. In addition, a pivoting mechanism of an one-dimensional, two-dimensional or three-dimensional structure can be disposed at one side of the body for adjusting angle and direction of the body, thereby facilitating operation of users.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A portable display device applicable to an electronic device having a socket provided with a second electrical connector, the portable display device comprising:
   a body having a display and a plurality of operating keys;
   an extension portion having a first end pivotably connected to the body, and a second end pluggable into the socket;
   a first electrical connector installed on the second end of the extension portion and engageable with the second electrical connector; and
   a lock member installed on the extension portion for locking the extension portion in the socket, wherein the lock member comprises a lock hook disposed on the first end of the lock member, a pressing portion movable in accordance with a movement of the lock hook, and an electrical switch penetrating the pressing portion.

2. The portable display device of claim 1, wherein the electronic device further comprises a lock hole disposed in the socket of the electronic device, and the extension portion can be locked in the socket of the electronic device by engaging the lock hook of the lock member with the lock hole of the socket.

3. The portable display device of claim 2, wherein the lock hook is released from the lock hole by pressing the lock member through the pressing portion, thus the extension portion can be taken out from the socket of the electronic device so that the first electrical connector can be disconnected from the second electrical connector.

4. The portable display device of claim 3 wherein the electrical switch is operated for interrupting a software program stored in the body, and further disconnecting the first electrical connector from the second electrical connector while pressing the pressing portion, so as to avoid adversely affecting a main program running in the electronic device.

5. The portable display device of claim 1 further comprising a pivoting mechanism pivotably connected to the body and fixed to the first end of the extension portion.

6. The portable display device of claim 5, wherein the pivoting mechanism has a first pivoting member longitudinally pivotably connected to the body, and a second pivoting member laterally pivotably connected to the first pivoting member and fixed to the first end of the extension portion.

7. The portable display device of claim 5, wherein the pivoting mechanism has a first pivoting member pivotably connected to the body and having a socket joint, and a third pivoting member fixed to the first end of the extension portion and having a ball joint jointed to the socket joint.

* * * * *